(12) United States Patent
Holden

(10) Patent No.: US 7,367,306 B1
(45) Date of Patent: May 6, 2008

(54) INTERNAL COMBUSTION ENGINE AND METHOD OF OPERATING

(76) Inventor: Randall W. Holden, 3793 Sundridge Pl., Saginaw, MI (US) 48603

( * ) Notice: Subject to any disclaimer, the term of this patent is extended or adjusted under 35 U.S.C. 154(b) by 0 days.

(21) Appl. No.: 11/606,411

(22) Filed: Nov. 30, 2006

(51) Int. Cl.
F02B 47/02 (2006.01)

(52) U.S. Cl. .................................... 123/250; 123/25 C

(58) Field of Classification Search .............. 123/25 C, 123/568.12, 250, 25 A, 25 B, 25 J, 25 R, 123/25 D, 25 E, 25 K, 25 N
See application file for complete search history.

(56) References Cited

U.S. PATENT DOCUMENTS

| | | | |
|---|---|---|---|
| 1,727,860 | A | 9/1929 | Carlson |
| 2,879,753 | A | 3/1959 | McKinley |
| 3,990,408 | A | 11/1976 | Kroll |
| 4,068,643 | A | 1/1978 | McKechnie |
| 4,131,100 | A | 12/1978 | Merrick |
| 4,370,958 | A | 2/1983 | Pischinger et al. |
| 4,393,817 | A | 7/1983 | Lindberg |
| 4,402,296 | A | 9/1983 | Schwarz |
| 4,416,229 | A | 11/1983 | Wood |
| 4,476,817 | A | 10/1984 | Lindberg |
| 4,499,861 | A | 2/1985 | Wiegand et al. |
| 4,499,862 | A | 2/1985 | Baumer et al. |
| 4,589,377 | A | 5/1986 | Van Dal |
| 5,125,366 | A | 6/1992 | Hobbs |
| 5,199,386 | A | 4/1993 | Hubbard |
| 5,609,131 | A | 3/1997 | Gray, Jr. et al. |
| 6,112,705 | A | 9/2000 | Nakayama et al. |
| 6,845,608 | B2 | 1/2005 | Klenk et al. |
| 6,986,252 | B2 | 1/2006 | Hedman |
| 7,131,263 | B1 * | 11/2006 | Styles .......................... 60/278 |
| 2002/0020386 | A1 | 2/2002 | Wright et al. |
| 2005/0155344 | A1 | 7/2005 | Kobayashi |
| 2006/0124079 | A1 | 6/2006 | Singh |
| 2006/0180121 | A1 | 8/2006 | Wickman et al. |
| 2007/0022977 | A1 | 2/2007 | Crower |

* cited by examiner

Primary Examiner—Stephen K. Cronin
Assistant Examiner—Hyder Ali
(74) Attorney, Agent, or Firm—John K. McCulloch

(57) ABSTRACT

An internal combustion engine having at least one cylinder within which is a reciprocable piston movable in a compression stroke followed by movement in a power stroke and wherein a combustible fuel mixture is injected into the combustion chamber, compressed, ignited, and burned to produce the power stroke of the piston. After the fuel has been ignited and during the compression of such mixture a quantity of water from a reservoir is injected into the combustion chamber and converted by the heat of combustion into superheated steam, thereby generating within the combustion chamber a force which assists in driving the piston through its power stroke. The products of combustion and steam are discharged from the cylinder following the power stroke and cooled in a heat exchanger in which the steam is condensed, following which the gases are exhausted and the condensate returned to the water reservoir.

16 Claims, 3 Drawing Sheets

INTERNAL COMBUSTION ENGINE AND METHOD OF OPERATING

This invention relates to an internal combustion engine and a method of operating such engine in such manner as to minimize the fuel required for operation.

BACKGROUND OF THE INVENTION

Internal combustion engines currently in use which operate in response to the combustion of fuel in one or more cylinders are relatively inefficient inasmuch as the major portion of heat generated by the combustion of the fuel is released to atmosphere without otherwise being utilized. The loss of such heat is undesirable for a number of reasons, not the least of which is the necessity of having to rely on the combustion of large quantities of fuel to ensure appropriate operation of the engine. The prior art contains many proposals for improving engine efficiency and conservation of fuel, but a good many of such proposals have not been adopted in the manufacture and use of internal combustion engines.

A principal object of this invention is to provide an internal combustion engine and method of operating such engine which overcome or greatly minimize the inefficiencies of such engines heretofore in use.

SUMMARY OF THE INVENTION

An internal combustion engine constructed and operated in accordance with the invention has at least one cylinder forming a combustion chamber in which a combustible mixture of fuel and air may be introduced. Within the cylinder is a reciprocable piston which moves through a compression stroke in which a fuel/air mixture injected into the compression chamber is compressed and subsequently ignited so as to burn the fuel and create an expansive force which drives the piston through a power stroke, as is conventional.

According to the invention a quantity of water is injected into the combustion chamber after the fuel therein has been ignited. Upon the injection of a quantity of water into the combustion chamber of the cylinder the heat of combustion of the fuel will convert the water into superheated steam which will expand and generate a force which, in conjunction with the force generated by the burning of the fuel, will drive the piston through its power stroke. The force applied to the piston in response to the generation of the superheated steam may constitute the principal force applied to the piston during its power stroke, thereby minimizing the quantity of fuel required to operate the engine.

Combustion of the fuel in the combustion chamber will generate gases of combustion which, along with residual steam, will be exhausted. Preferably, the exhaust will be circulated through a heat exchanger in which the gases of combustion and the steam will be cooled, thereby condensing water from the steam and separating the condensate from the gases. The gases may be discharged to atmosphere, whereas the condensate may be returned to the water source for recycling.

THE DRAWINGS

THE PREFERRED EMBODIMENT

Figure 1:
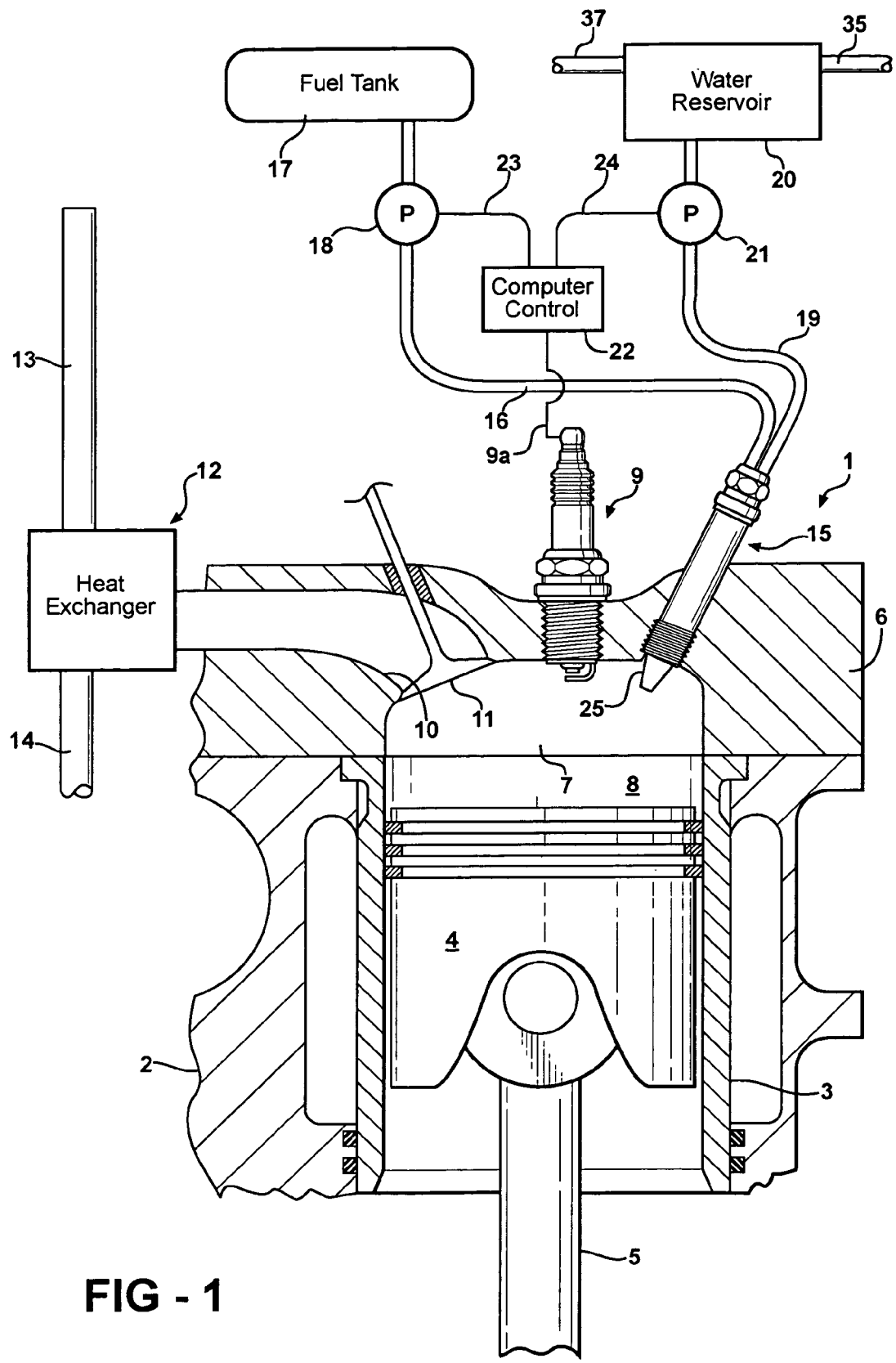
FIG. 1 is a diagrammatic view of one cylinder of an internal combustion engine constructed in accordance with the invention.
Figure 2:
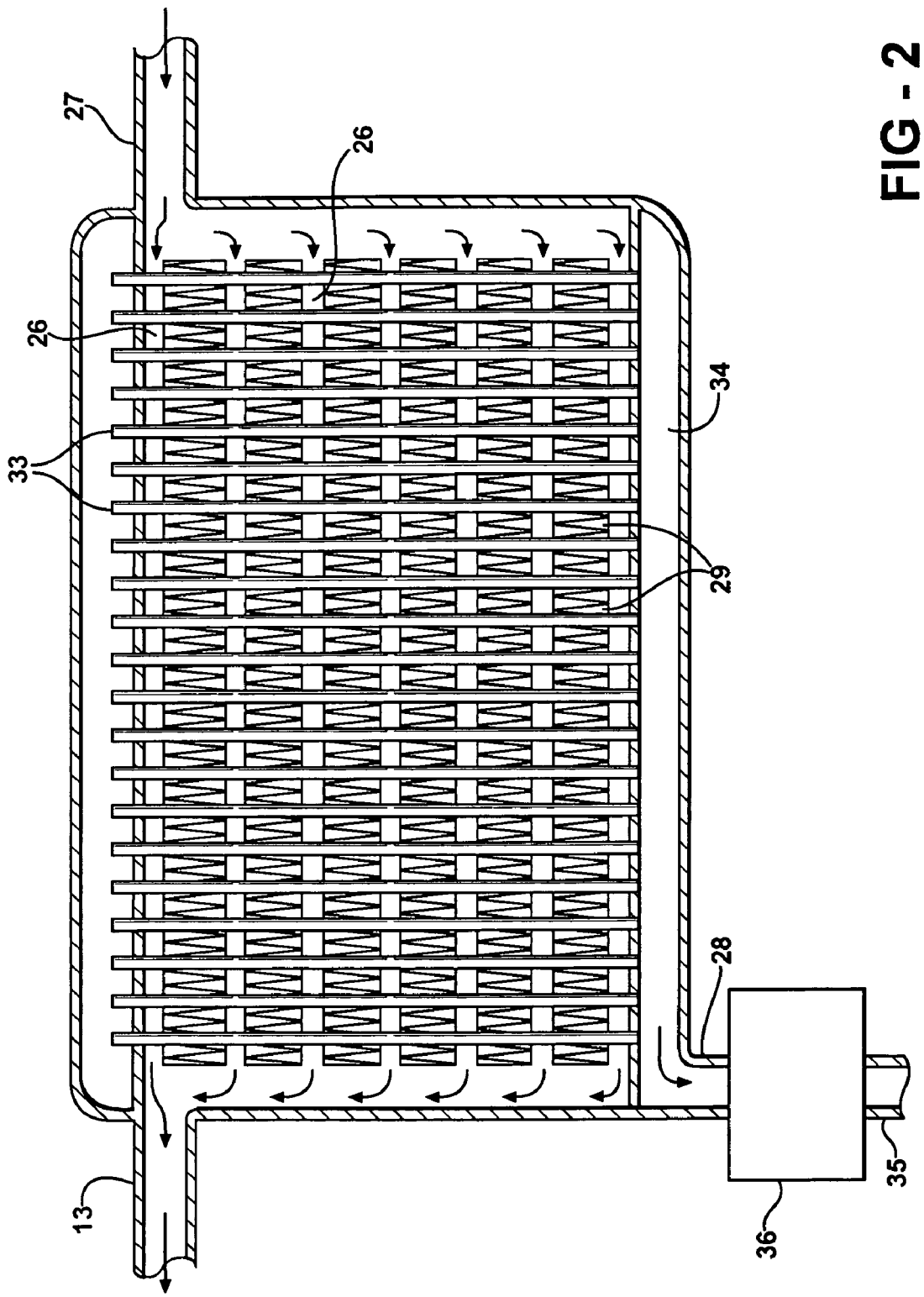
FIG. 2 is a diagrammatic elevational view of a heat exchanger for use with the engine.
Figure 3:
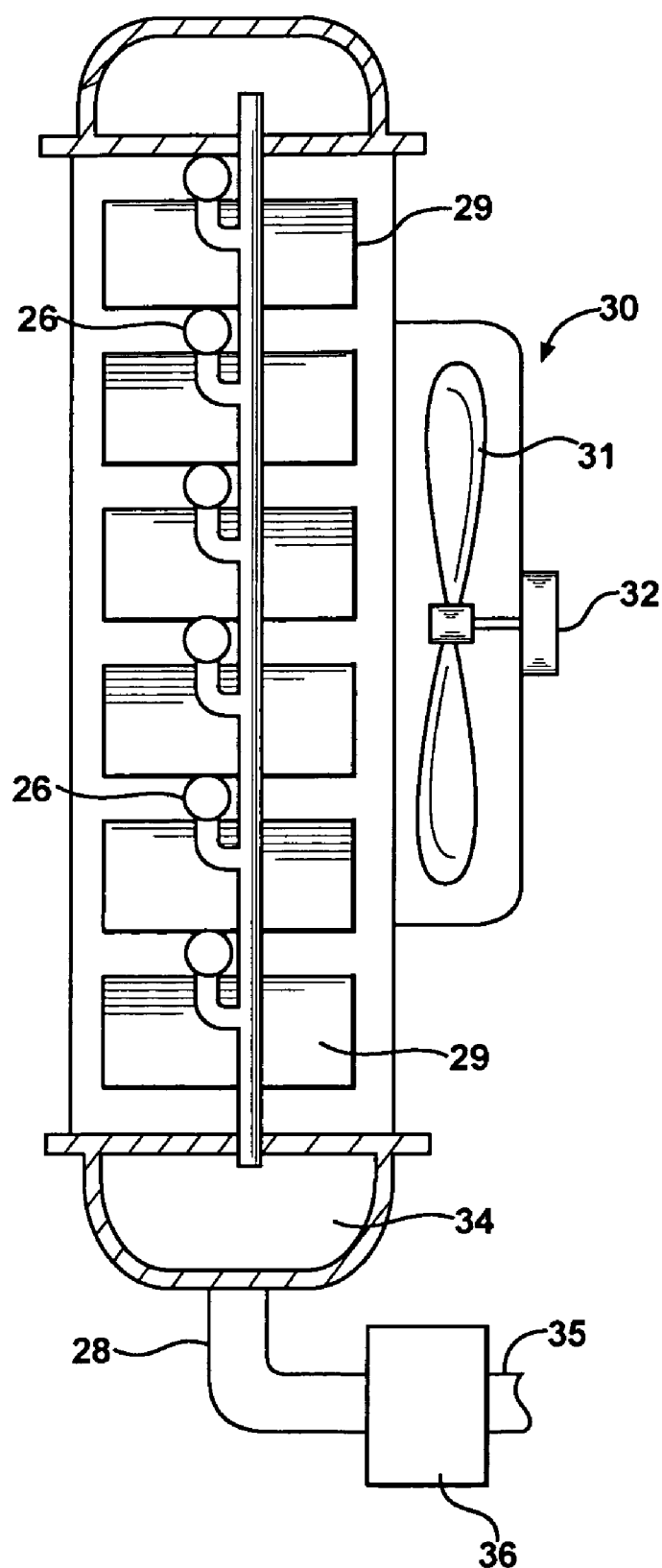
FIG. 3 is a vertical sectional view of the heat exchanger.

An internal combustion engine constructed in accordance with the invention is designated generally by the reference character 1 and includes an engine block 2 within which is a plurality of cylinders, one of which is shown at 3. Within the cylinder is a reciprocable piston 4 coupled to a piston rod 5 which is reciprocated by a rotary cam shaft (not shown) as is conventional. Atop the block 2 is a cylinder head 6 having a cavity 7 in communication with the cylinder 3, thereby forming with the upper end of the cylinder a combustion chamber 8. Mounted in the cylinder head 6 and extending into the combustion chamber is a conventional ignition or spark plug 9 coupled by wiring (not shown) to a conventional ignition system. An exhaust passage 10 communicates with the combustion chamber 8 and normally is closed by an exhaust valve 11 which periodically is actuated in a conventional manner to enable the contents of the combustion chamber to be exhausted from the latter following the power stroke of the piston to a heat exchanger 12 from which gases and condensate are separated and delivered to separate destinations via lines 13 and 14, respectively, as will be explained.

Also extending into the combustion chamber 8 is a preferably dual injector 15 to which is connected one end of a delivery line 16 by means of which a mixture of air and a combustible fuel, such as gasoline or any other appropriate and known fuel, may be delivered from a fuel tank 17 via a pump 18, as is conventional. Also in communication with the injector 15 is a water delivery line 19 by means of which water from a reservoir 20 may be delivered via a pump 21 to the combustion chamber. A control computer 22 of known construction is coupled by wiring 23 and 24 to the fuel pump 18 and the water pump 21, respectively, and by wiring 9a to the plug 9.

The injector 15 includes a nozzle 25 through which a measured amount of combustible fuel/air mixture passes into the combustion chamber 8 in response to each energization of the injector. Also passing through the same nozzle 25 (or a second, similar nozzle if preferred) is a measured amount of water from the reservoir 20. The control computer 22 controls the fuel pump 18 and the injector in such manner as to inject a predetermined quantity of the fuel/air mixture into the combustion chamber as the piston 4 approaches its top dead center position, as is conventional. As the piston approaches its top dead center position the fuel/air mixture will be compressed and, at a predetermined position of the piston, the spark plug 9 under the control of the control computer 22 will be energized to ignite the fuel. The fuel will commence to burn, thereby expanding the gas volume and generating heat.

At a predetermined time, such as 3 to 30 milliseconds following ignition, the injector 15 may be activated via the control computer 22 to inject a measured quantity of water into the combustion chamber as the fuel burns and as the compression stroke continues. The burning fuel will generate sufficient heat to convert the water into superheated steam and increase the pressure within the combustion chamber. Following the completion of the compression stroke the combined pressure generated by the steam and the burning fuel will effect driving of the piston downwardly, as viewed in FIG. 1, through a power stroke, as is conventional. The majority of the force generated in the combustion chamber is attributable to the conversion of the water into superheated steam, and such conversion will cool the gases of combustion, thereby enabling the engine to operate cooler than an engine operating on gasoline or other combustible fuel only.

Following the power stroke the piston will be driven via the cam shaft toward the combustion chamber and the valve 11 will be opened to enable the steam and products of combustion to pass from the combustion chamber into the heat exchanger 12. Products of combustion and steam introduced to the heat exchanger via the exhaust passage 10 will enter a plurality of passages 26 each of which is in communication at one end with a heat exchanger inlet 27 and at the opposite end with the tail pipe 13 and a heat exchanger outlet 28. The passages 26 are spanned by fins 29 which assist in the cooling of the gases of combustion and steam traversing the passages. Such cooling is assisted by a fan 30 having blades 31 and driven by an electric motor 32 so as to circulate air at ambient temperature past the passages and cool the contents of the passages to effect condensation of the steam. The passages 26 also communicate with condensate lines 33 which enable condensate to flow downwardly to a collection area 34 from which it may flow via a return pipe 35 and a pump and filter 36 to the water reservoir 20. The gases of combustion will flow separately from the heat exchanger to atmosphere via the tail pipe 13. Water returned to the reservoir 20 may be recycled, and should additional water be required, it may be delivered from a source thereof to the reservoir via a feed pipe 37.

A particularly advantageous characteristic of the invention is that delaying the injection of water into the combustion chamber until the fuel has been ignited not only provides heat for the conversion of the water into superheated steam, but also cools the combustion gases. The injection of water into the combustion chamber, following ignition of the fuel, and the conversion of the water into steam provides additional force to move the piston through its power stroke. The force derived from the steam may be even greater than that derived from the combustion of the fuel, thereby enabling the engine to operate efficiently using much less fuel than otherwise would be required to drive the engine at any selected speed.

The amount of water to be injected per cycle to create the adequate amount of superheated steam can be calculated and should be such as substantially to be proportional to the heat released after the ignition of a precise amount of fuel. As a result, a portion of the heat of combustion will be absorbed by the water, thereby enabling the engine to operate at much cooler temperatures and use less fuel than a conventional internal combustion engine of substantially the same horsepower.

If the engine is used in a climate in which water in the reservoir 20 may freeze, the reservoir 20 and the lines leading to and from such reservoir may be heated electrically and/or insulated in known manner. The water in the reservoir also may be heated by an electrically operated heater (not shown) to a temperature of about 212° F. so as to accelerate the generation of steam during the injection of the water into the combustion chamber. Instead of, or in addition to, heating the water in the reservoir for cold temperature operation, the water in the reservoir may include an appropriate quantity of ethanol or other antifreeze substance. If ethanol is used it, too, may be burned in the combustion chamber, thereby further reducing the quantity of gasoline or other combustible fuel required to operate the engine.

The disclosed embodiment is representative of a presently preferred form of the invention, but is intended to be illustrative rather than definitive thereof. The invention is defined in the claims.

I claim:

1. In an internal combustion engine having at least one cylinder forming a combustion chamber and within such cylinder is a reciprocable piston movable relative to said cylinder through a compression stroke followed by a power stroke, the improvement comprising means for introducing a quantity of a combustible fuel mixture to said combustion chamber for compression in response to movement of said piston during said compression stroke; means for igniting said fuel during compression of said mixture and thereby generating in said combustion chamber heat and an expansion force operable to move said piston through said power stroke following said compression stroke; and means for introducing into said combustion chamber at a selected time interval following ignition of said fuel a quantity of water, the time of said injection of water being such that heat from the combustion of said fuel is sufficient to convert the injected water to superheated steam, the conversion of said water into steam generating in said combustion chamber an additional force operable to assist said expansion force in moving said piston through said power stroke.

2. The engine according to claim 1 including means for exhausting products of combustion from said combustion chamber, and means for cooling such products of combustion.

3. The engine according to claim 2 wherein said products of combustion contain moisture which condenses in response to said cooling.

4. The engine according to claim 3 wherein said cooling means comprises a heat exchanger, means for conducting said products of combustion to said heat exchanger following which said products of combustion are separated into gases and a condensate, and means for separately conducting said gases and said condensate from said heat exchanger.

5. The engine according to claim 4 including a water reservoir, means for conducting water from said reservoir to said cylinder, and means for conducting said condensate from said heat exchanger to said reservoir.

6. In a method of operating an internal combustion engine having at least one cylinder forming a combustion chamber and within which is a reciprocable piston movable through a compression stroke followed by a power stroke, the improvement comprising introducing into said combustion chamber a quantity of a combustible fuel mixture; moving said piston during said compression stroke in a direction to compress said mixture in said combustion chamber; igniting and burning said fuel during compression of said mixture and thereby generating in said combustion zone heat an expansion force operable to move said piston through said power stroke; and introducing into said combustion chamber at a selected time interval following ignition of said fuel a quantity of water such that the heat generated by the ignition and burning of said fuel is sufficient to convert said water into steam, thereby generating in said combustion chamber an additional force operable to cooperate with said expansion force in moving said piston through said power stroke.

7. The method according to claim 6 including exhausting gases and other products of combustion of said fuel mixture from said combustion chamber and cooling said gases and other products of combustion.

8. The method according to claim 7 including cooling said products of combustion sufficiently to condense moisture in said products of combustion and form condensate.

9. The method according to claim 8 including separating the products of combustion and said condensate, discharging said products of combustion from said combustion chamber, and delivering said condensate to said reservoir.

10. The method according to claim 6 including introducing said water into said combustion chamber during the compression stroke of said piston.

11. The method according to claim 6 wherein said selected time interval is between 3 and 30 milliseconds following the ignition of said fuel.

12. The engine according to claim 1 wherein said selected time interval is between 3 and 30 milliseconds following ignition of said fuel.

13. The engine according to claim 6 wherein heat generated by the combustion of said fuel is sufficient to convert said water to superheated steam.

14. In an internal combustion engine having at least one cylinder forming a combustion chamber and within such cylinder is a reciprocable piston movable relative to said cylinder through a compression stroke followed by a power stroke, the improvement comprising means for introducing a quantity of a combustible first mixture of air and a first fuel to said combustion chamber for compression in response to movement of said piston during said compression stroke; means for igniting said first fuel during compression of said mixture and thereby generating in said combustion chamber heat and an expansion force operable to move said piston through said power stroke following said compression stroke; and means for introducing into said combustion chamber at a selected time following ignition of said fuel a second mixture comprising a quantity of water and a quantity of a combustible second fuel different from said first fuel and which in response to combustion produces water and other products of combustion, said water in said combustion chamber being convertible into steam by heat generated from the combustion of said first fuel and said second fuel, the conversion of said water in said combustion chamber to steam generating in said combustion chamber an additional force operable to assist said expansion force in moving said piston through said power stroke following said compression stroke.

15. The engine according to claim 14 wherein the heat generated by the combustion of said first fuel is sufficient to superheat said steam.

16. The engine according to claim 14 wherein said second fuel is ethanol.

* * * * *

UNITED STATES PATENT AND TRADEMARK OFFICE
CERTIFICATE OF CORRECTION

PATENT NO. : 7,367,306 B1 Page 1 of 1
APPLICATION NO. : 11/606411
DATED : May 6, 2008
INVENTOR(S) : Randall W. Holden It is certified that error appears in the above-identified patent and that said Letters Patent is hereby corrected as shown below:

Column 4, claim 6, line 52, after "heat" insert -- and --.

Signed and Sealed this

Twenty-ninth Day of July, 2008

JON W. DUDAS
*Director of the United States Patent and Trademark Office*